Jan. 14, 1941.  A. R. SHARPLES  2,228,782
AUDIBLE READING APPARATUS
Filed June 27, 1940          4 Sheets-Sheet 1

Inventor
Alfred R. Sharples
By Barr, Borden & Fox
Attorneys

| UNIT | FIRST REV. | SECOND REV. | THIRD REV. | |
|---|---|---|---|---|
| STENCIL | CONTINUOUS ROTATION | | | |
| | SCANNING | SCANNING | SCANNING | |
| AUDIO RECORD | "F" LATERAL MOTION | SPEAK "F" RETURN | LATERAL "R" Motion | SPEAK "R" RETURN |
| AUDIO RECORD | | LATERAL "O" MOTION | SPEAK "O" RETURN | |
| EASEL | | HORIZONTAL FEED | | |

Patented Jan. 14, 1941

2,228,782

UNITED STATES PATENT OFFICE 2,228,782

AUDIBLE READING APPARATUS

Alfred R. Sharples, Drexel Hill, Pa.

Application June 27, 1940, Serial No. 342,637

19 Claims. (Cl. 35—1)

The present invention relates to an apparatus for producing an audible sound corresponding to the spoken sound of a character or letter, such produced sound functioning as a result of a viewing or scanning of a visible character or letter.

Some of the objects of the present invention are to provide an apparatus for translating a visible character or letter into the audible sound of that character or letter as a means for reading to blind persons; to provide a novel means for scanning a printed page; to provide means associated with a scanning mechanism for producing a sound corresponding to a character or letter on a printed or typed page as scanned by said mechanism; to provide means for automatically selecting one of a number of sound reproducing means, the selected one corresponding to a selected visible character or letter; to provide a reading device wherein visible characters or letters are reproduced audibly and smoothly in such rapid succession as will enable the listener to identify the characters or spell out words in a time interval comparable to that required for Braille reading; and to provide other improvements as will hereinafter appear.

In the accompanying drawings

Figures 1, 2, 3, 4:
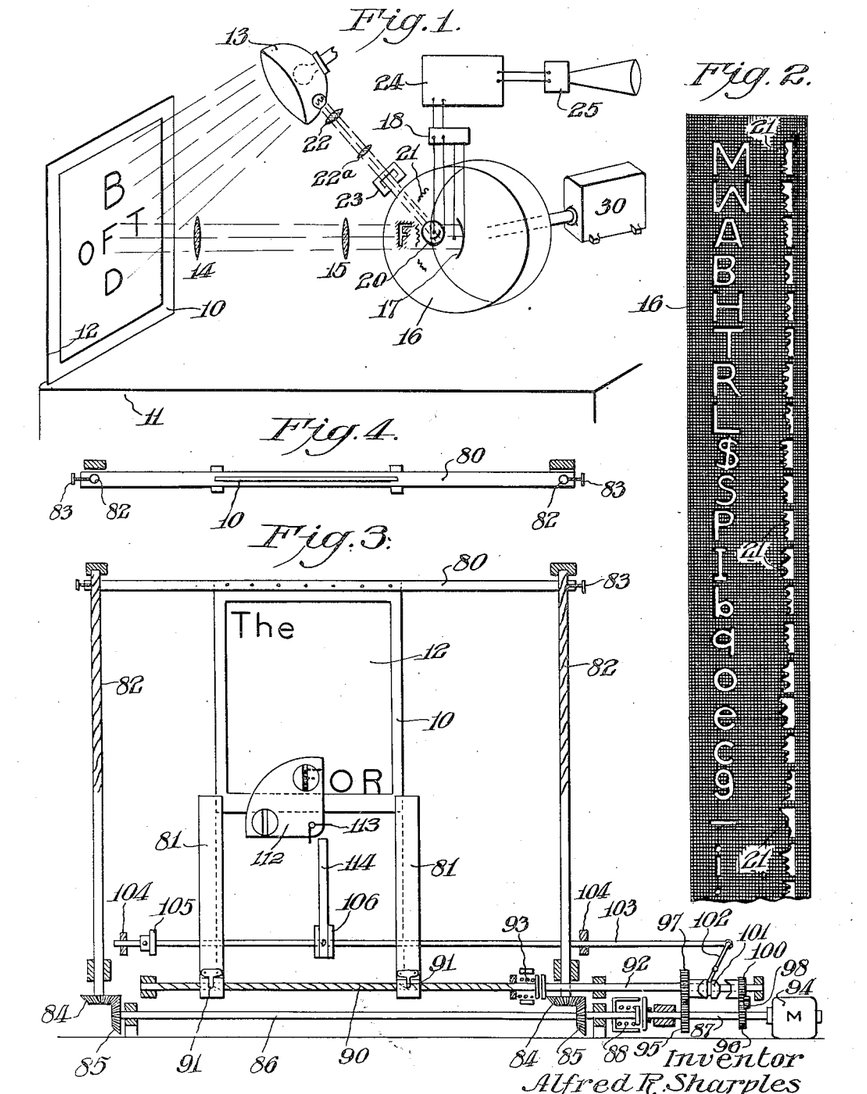
Fig. 1 is a schematic showing of one form of apparatus embodying the present invention.
Fig. 2 represents the development of the perimeter of a drum showing one arrangement of the alphabet, numerals, and sound track as embodied in the present invention.
Fig. 3 represents a front elevation of one form of control for the easel which mounts the reading matter.
Fig. 4 represents a plan in part section of the same.

Referring to the form of the invention shown in Fig. 1, the support for the visible matter to be read by the apparatus is preferably an easel 10 which stands upon a suitable fixed base 11. A sheet 12 with printed characters thereon is fastened to the face of the easel 10 to take a position substantially in a vertical plane. As shown this sheet 12, displays by way of example three lines of letters and in the following description letters will be referred to with a generic meaning, it being understood as broadly including numbers, punctuation marks, or any other indicia. Also reference to the sheet 12 is in a broad sense as this may be a page of a book or the like. In this form of the invention the actuation of the sheet 12 is manual, that is it is moved step by step horizontally for successive scanning of the letters of a word, and moved line by line vertically for transferring the scanning operation from one line of reading matter to the next line.

For the purpose of scanning a line of letters and projecting each letter in turn to the scanning device, a light source 13 is suitably mounted to direct light rays upon the face of the sheet 12. A letter projecting optical system including lenses 14 and 15 is mounted for registration with the scanning point on the sheet 12, which is here shown as projecting an image of the letter F. This system is so focussed as to project an image of the proper size to coincide with a transparent stencil F when the latter is brought into the field of the projected image rays. This stencil F is one of an alphabet series of transparent stencils printed or photographed on the perimeter of an opaque drum 16 which is mounted to rotate in such a manner as to intercept the image rays of the optical system so that in the case of the letter F, its projected image will accurately coincide with the aforesaid stencil F of the drum and thus cut off light rays normally traversing the stencil F. Thus every letter on a sheet of printed matter can be compared with the like letter on the drum 16, and each comparison test blocks out a stencil letter. This change of light value serves to control the operation of a photo-electric cell 17 located within the drum 16 in registered relation to the image rays from the optical system. When coincidence of image and stencil takes place the photo-cell energizes a relay 18 to close an electrical circuit including a photo-electric cell 20, which latter functions to reproduce the sound of the letter image then in coincidence with a stencil letter.

In order that this sound reproduction may take place in related sequence, the perimeter of the drum 16 is provided with a circumferentially arranged transparent sound track 21 formed of a succession of sound records corresponding respectively to the circumferential row of stencil letters, each sound track portion being located beside the letter it represents. This sound track 21 in conjunction with an exterior beam of light from the source 13 and appropriate optical system including lenses 22 and 22a, and slotted diaphragm 23 delivers an audible modulated output to the amplifier 24 when the circuit of the photo-cell 20 is closed by the functioning of the photo-cell 17. A loud speaker 25 is in the circuit of the amplifier and reproduces audibly the selected letter. The drum 16 is arranged to be rotated for scanning at a proper speed for audio reproduction by means of an electric motor 30.

With reference to the letters on the drum, it should be noted that these preferably form a complete font with the extreme left edges of the letters alined in the same plane. Furthermore it is desirable to arrange the letter sequence according to their optical geometric complexity instead of alphabetically as might be expected. This arrangement is used to prevent incorrect reproduction of scanned letters as would certainly occur if true alphabetical sequence were followed. A letter is read when its dark projected image exactly covers a letter in clear on the drum and if the projected image covered more than the stencil it would cause a response even though it was not the exact matching letter. As shown the sequence of letters starts with the most complex stencil and follows in successive grading to the simplest stencil, M, W, A, E, H, T, R, L, S, F, I, etc. As above stated each stencil letter is opposite a sound track capable when actuated of causing control means to enunciate the sound of its adjacent stencil. For purposes of illustration the sound track type of phonetic record has been selected such as used in movie film, but it is to be understood the invention is not so limited but may be applied to phonographic grooved records, magnetized steel wire or other suitable means.

The form of the invention as above described in connection with Fig. 1 represents the invention in its simplest form and while it readily scans and reads the letters the time between each letter reproduction is relatively slow and may be found objectionably staccato. The reason for this will be understood because but one character is read for one revolution of the drum 16, hence if there are eighty letters or characters in stencil, one sound only will be produced during one eightieth part of a revolution. Speeding up of the reproduction may be accomplished by putting the audio modulated output of the audio-actuated photo-cell system through a retarding circuit so that without impairing the modulation, the audio reproduction is given a longer base line whereby when the drum and associated parts is caused to function more rapidly, sound reproduction can be secured during approximately twenty-five to fifty percent of the former time interval. The preferred system for carrying out this stepped-up reproduction is illustrated and explained in the following.

Referring to Figs. 3 to 12 inclusive the scanning system is the same as that described in conjunction with Fig. 1, except means are provided for an automatic step by step travel of the easel 10 as will be later described. As shown the drum 16 is keyed to a shaft 31 journalled in bearing standards 32 and driven by a gear reduction 33 (preferably of a five to one ratio) from the main shaft 34 of motor 30. Two audio record drums 35 and 36 are keyed to the shaft 31 for rotation therewith and for axial sliding movement thereon, this latter movement allowing each drum to travel its full length transversely past a given point. In the case of drum 35 this point is represented by a light source 37 fixed in position within the drum 35 by an exteriorly projecting tube 38 through which conductors reach the light source. The drum 35 is provided with a plurality of sound tracks 40 respectively representing the characters on the drum 16 but arranged axially in the same order, each track extending approximately one-half way around the circumference of the drum, such tracks being spaced about one-twentieth of an inch apart. With this arrangement lateral or axial movement of the drum 35 need not be more than four inches in order to take care of all the tracks in making a character selection. With a track alined with the light source 37 rays emanating from the drum 35 pass through a slotted diaphragm 41 and optical system 42 to converge upon a photo-cell 43 which controls the operating circuit of the reproducing apparatus 24 and 25. A like construction is provided for the drum 36 and need not be here described in detail except to identify the parts as light source 44, supporting tube 45, sound tracks 46, slotted diaphragm 47, optical system 48, photo-cell 50. This cell 50 is arranged in parallel with the photo-cell 43 so that it also can control the operating circuit of the reproducing apparatus 24 and 25. The arrangement is such that the two photo-cells are alternately actuated as will later appear.

Figure 8:
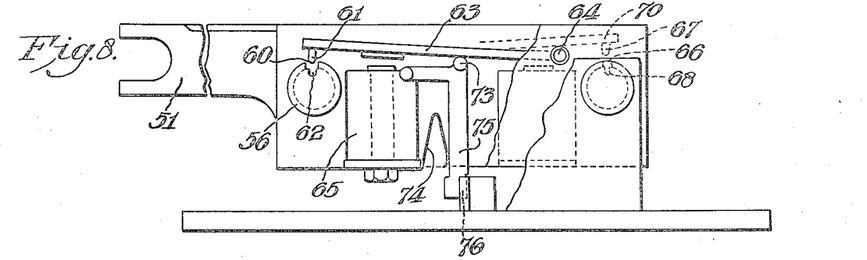
Fig. 8 represents an end elevation of one form of clutch feeding mechanism.
Figure 9:
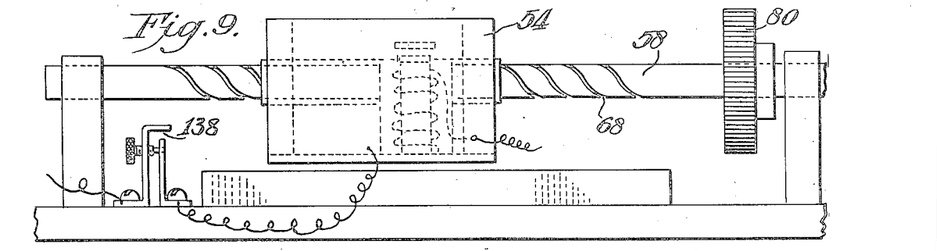
Fig. 9 is a side elevation of the same.
Figure 10:
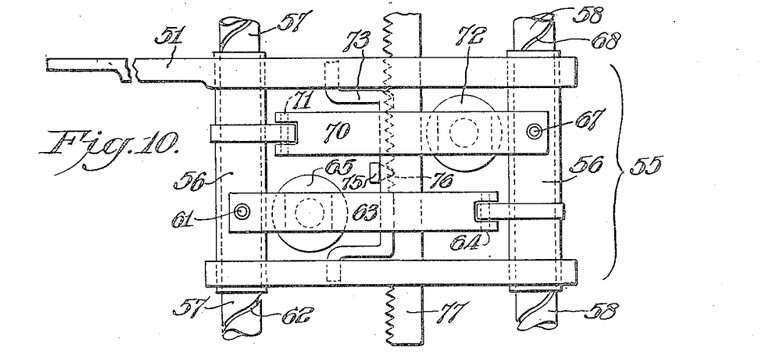
Fig. 10 is a detail in plan of the carriage shown in Figs. 8 and 9.
Figure 11:
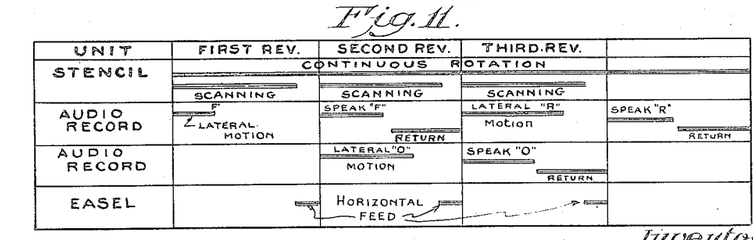
Fig. 11 is a diagram of the cycle of operations and Fig. 12 is a diagram of the control mechanism.
Figure 12:
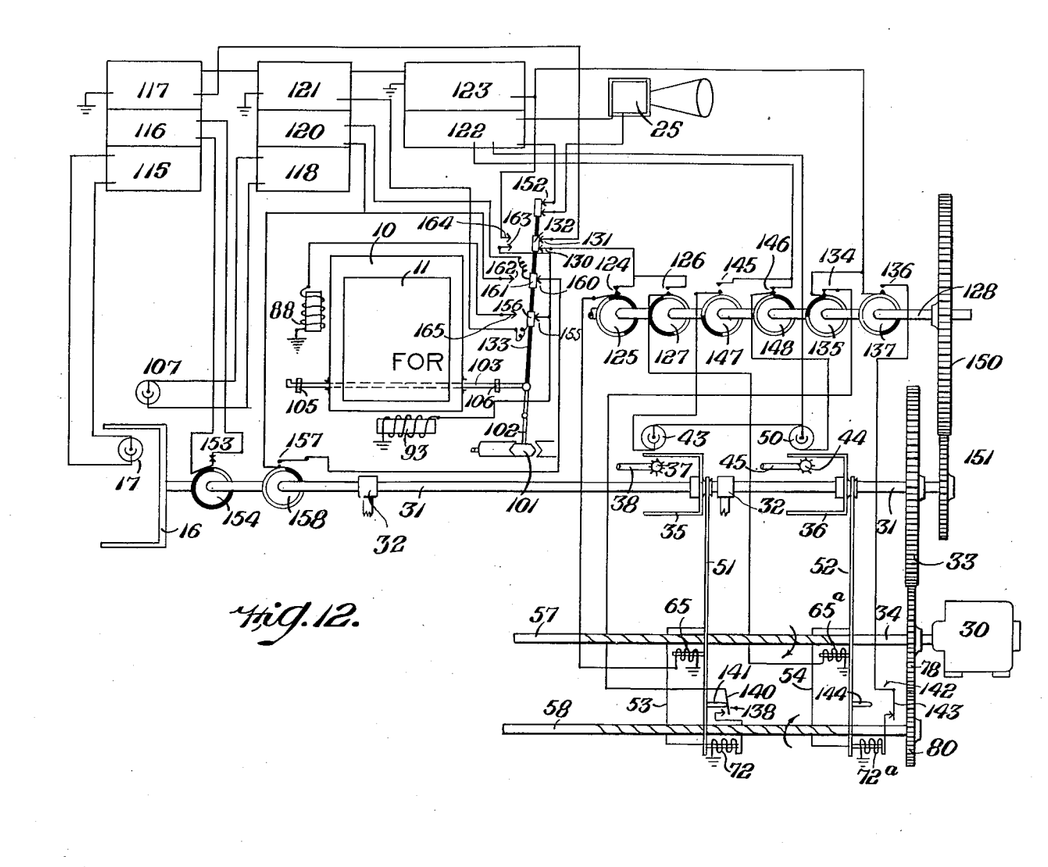

For moving the drums 35 and 36 axially of the shaft 31, two arms 51 and 52 project radially from the respective drums and are connected respectively to two movable carriages 53 and 54. As these carriages are of like construction but one will be described in detail as shown in Figs. 8, 9, and 10. Thus each carriage comprises a rectangular frame 55 including two spaced parallel sleeves 56 respectively mounted on spirally grooved shafts 57 and 58 rotatable in opposite directions. The sleeve 56 is provided with a hole 60 opening against the face of the shaft 57 and through which a clutch pin 61 is arranged to pass and enter the spiral feed groove 62 of the shaft 57 when required. The pin 61 is carried by an armature 63 pivoted at 64 to the frame 55 for actuation by a relay coil 65. A similar clutch arrangement is provided for engaging the shaft 58, namely hole 66, clutch pin 67 for feed groove 68, armature 70, pivot 71 and relay coil 72. The armatures 63 and 70 are arranged to be returned to non-clutching position by means of a U-shaped restoring bar 73 pivoted at its ends in the frame to extend transversely below the said armatures, being held thereagainst by a spring 74 which bears against an extension arm 75. This arm 75 carries a laterally disposed detent 76 shaped to engage a rack bar 77 which is located between the shafts 57 and 58 and parallel thereto. By this construction whenever both relay coils 65 and 72 are deenergized the spring 74 not only declutches the armatures but throws the detent 76 into engagement with the rack bar 77 to lock the carriage in its located position. The shaft 57 is directly driven from the motor 30 in the direction to feed the carriages toward the drum 16, while the shaft 58 is driven from the main drive gear 78 and gear 80 (ratio one to one), in the direction to feed the carriages away from the drum 16. The initial or starting position of the carriages 53 and 54 is to the right as seen in Fig. 12 so that the respective light sources 37 and 44 are adjacent to the first sound track at the left end of the audio drums. Preferably the spiral feed grooves 62 and 68 have a pitch of one turn per inch and with a gear ratio of five to one, as heretofore suggested, the drum feeding carriages will travel five inches while the drum shaft 31 makes one revolution. While the parts of the carriage 54 are the same as those for carriage 53, the controlling magnets are identified respectively by 65ª and 72ª so that the description of the operation of system may be readily followed. It will also be seen that the movement of the carriage 53 controls the drum 35 while the movement of the carriage 54 controls the drum 36. Also magnets 65 and 65ª position the respective drums for sound track selection, while the magnets 72 and 72ª act to restore the drums to starting position.

For supporting the easel 10 and controlling its vertical and horizontal movements automatically, a bar 80 is provided to which the upper margin of the easel 10 is attached in any suitable manner to be suspended for sliding vertically in spaced guide posts 81. The ends of the bar 80 are apertured to telescope respectively with feed screws 82 of the spiral groove type and with which manually adjustable pins 83 are adapted to engage respectively. As shown these pins 83 are axially movable through the respective ends of the bar 80 so that when in the inner position these pins 83 engage the screws 82, and when in the outer position these pins 83 reelase the bar 80 for manual control. The screws 82 are operatively mounted and receive motion respectively through pairs of bevel gears 84 and 85, the gears 85 being keyed to a shaft 86 which receives motion from a drive shaft 87 through the medium of a clutch 88. This clutch 88, in the present instance, is of a magnetic type of any well known construction. The guide posts 81 are mounted on a horizontally journalled feed screw 90 and are fed thereby by pins 91 riding in the screw spiral. The screw 90 receives motion from a driven shaft 92 through the medium of a second magnetic clutch 93. The drive shaft 87 is actuated by an electric motor 94 and carries two gears 95 and 96, the former meshing with a gear 97, and the latter with a pinion 98 which in turn meshes with a gear 100. The gear 97 forms a part of a friction clutch and is loose on the driven shaft 92, while the gear 100 forms another part of the same clutch. Between those two clutch parts is the movable clutch part 101 which is keyed to the shaft 92 for sliding movement to select one or the other of the clutch parts. The ratio of the gears 96, pinion 98 and gear 100 is such as to not only reverse the rotation of the feed screw but to increase the speed of rotation in order that a relatively quick return of the easel can be made to begin the scanning of another line of reading matter. The movable clutch part 101 is arranged to be moved by a pivoted shift fork 102 connected to an operating rod 103 which generally parallels the screw 90 and is slidable in bearings 104. Two trips 105 and 106 are fixed to the rod 103, one being in position to be actuated by the easel carrying structure near the limit of its movement in one direction and the other by the same structure near the limit of its movement in the opposite direction.

From the foregoing it will be seen that energization of the clutch 93 results in a horizontal movement of the easel 10 to bring the letters of a word successfully into register with the scanning light rays, while energization of the clutch 88 results in a vertical movement of the easel 10 to bring the lines of words successively into proper position for letter scanning. This clutch energization is under the control of a photo-electric cell 107 (Fig. 12) located to receive rays of light transmitted from the page of reading matter by way of a suitable optical system 108. These rays are segregated for both vertical and horizontal alinement by means of diaphragms 110 and 111 carried by a quadrant 112. The diaphragm 110 has a relatively narrow light slit for letter scanning, and the diaphragm 111 has a wider slit for line scanning. The quadrant 112 is pivoted for swinging movement in an arc to bring the diaphragms, one at a time, into position to pass the light rays to the photo-cell 107. A two arm trip 113 projects from the quadrant into the path of a pick-up rod 114 which is fixed to the operating rod 103. Thus when the word scanning of a line is concluded the pick-up rod 114 will engage the trip 113 and swing the quadrant to its position where the diaphragm 111 becomes operative for line scanning.

Figures 5, 6, 7, 13:
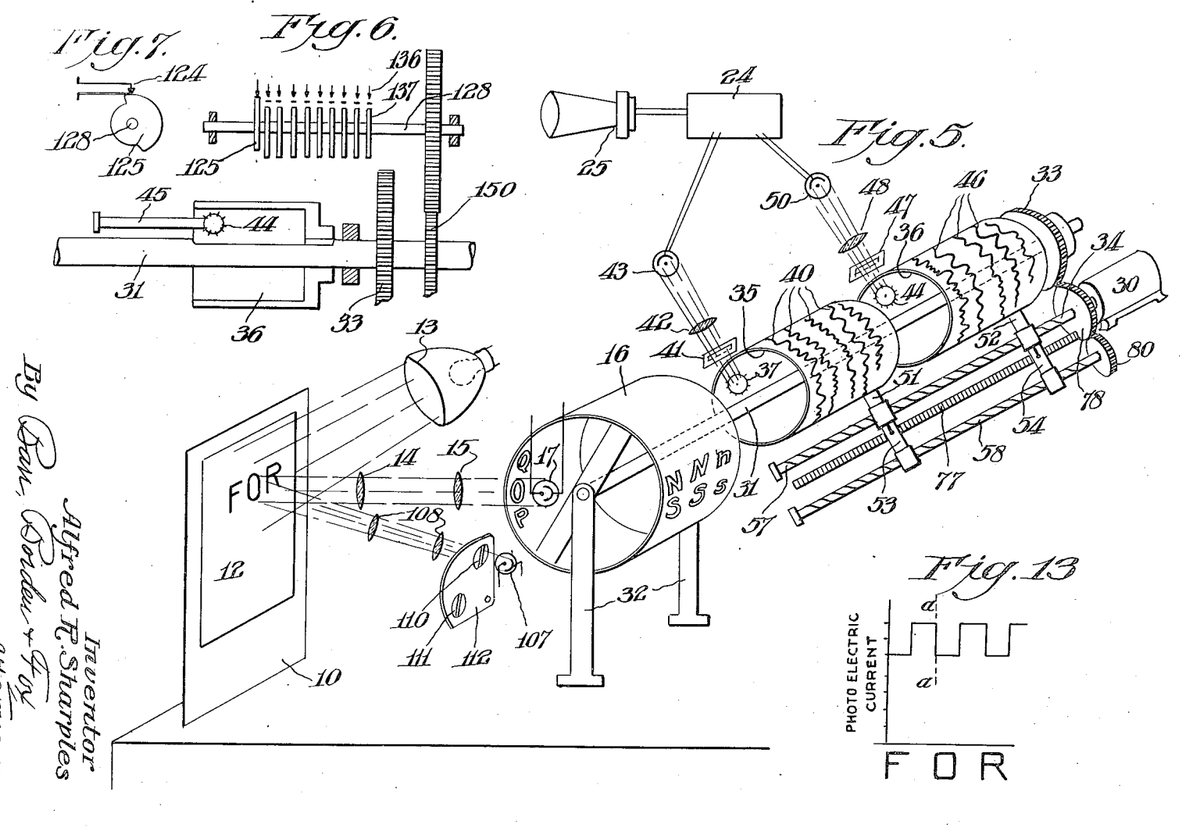
Fig. 5 is a schematic showing of another form of the invention.
Fig. 6 represents a detail of a drum mounting and its associated parts.
Fig. 7 represents a detail of one of the contact control cams.

Before explaining the means for selecting the proper control electro-magnet for sequental cycle operation, a brief review of the functions of the respective photo-cells will be stated, and followed by a general description of the respective units controlled by the photo-cells. Thus photo-cell 17 functions in the scanning of the letters as each is brought into scanning position; the photo-cell 43 functions in conjunction with the sound tracks on the drum 35; the photo-cell 50 functions in conjunction with the sound tracks on the drum 36; and the photo-cell 107 functions in conjunction with the control of easel movements. The photo-cell 17 is arranged in circuit with an amplifier 115 which controls a Thyratron tube 116 for governing the action of a power tube 117. The photo-cell 107 is arranged in circuit with an amplifier 118 which controls a Thyratron tube 120 for governing the action of a power tube 121. The photo-cells 43 and 50 are respectively connected in parallel relation but selectively operable with an audio amplifier 122 which has its output connected to the loud speaker 25 or other sound reproducer. A power pack 123 is utilized in conjunction with the control circuits for the respective magnetic clutches. The foregoing amplifiers, Thyraton and power tubes are illustrated diagrammatically because each is a well known unit and it will be understood that the photo-cells acting through the amplifier circuits following a decrease in light value and consequent photo-electric current causes the Thyratron to function and by grid control block the plate current in the power output tube. This current variation is shown in Fig. 13 where line a—a indicates the point at which photo-cell 107 would function on letter "O" following its clear separation from the previous letter.

In order to selectively actuate the magnets 65 and 65ª, the former is in an electrical circuit arranged to be opened and closed through the medium of a spring opening switch 124 and closing rotatable cam 125 as the preferred construction though a commutator might be substituted. The magnet 65ª is in an electrical circuit arranged to be opened and closed through the medium of a spring opening switch 126 and closing rotatable cam 127. These cams 125 and 127 are mounted for rotation on a counter-shaft 128 and are each arranged to hold their respective circuits closed for one-half a revolution and open for one-half a revolution of the shaft 128, but the relation of the cams is such that one circuit is open when the other is closed. The switches 124 and 126 are connected in parallel to a contact 130 which is located adjacent a second contact 131, this latter receiving current from the power tube 117. A bridging contactor 132 is mounted on a movable insulating bar 133 and when against the contacts 130 and 131 allows current to flow from the power tube 117 provided this latter is functioning as will be later explained.

In order to selectively actuate the magnets 72 and 72ª, the former is in an electrical circuit arranged to be opened and closed through the medium of a spring opening switch 134 and closing rotatable cam 135, while the latter is in an electrical circuit arranged to be opened and closed by a spring opening switch 136 and closing rotatable cam 137. The switches 134 and 136 are in parallel and receive energy from the power pack 123. The cams 135 and 137 are arranged to hold the respective circuits open for three-quarters of a revolution of the counter-shaft 128 upon which they are mounted, while the rotational timing is adjusted with respect to the cycle of operations as a whole. Since the lateral travel of the drums 35 and 36 is variable it is necessary to make some provision for stopping the restoring travel of the carriages always at the same starting point, otherwise the return from a short lateral sound track selecting position could not stop at the same place as that from a long lateral sound track selecting position. To that end, therefore, a circuit breaker 138 is arranged in series with the switch 134 and is normally held closed by a spring pressed contactor 140 which is located in the path of rearward movement of a trip finger 141 carried by the arm 51 and acting to open the contactor 140 at the exact starting point for the drum. A like circuit breaker 142 is in series with the switch 136 and has a spring pressed contactor 143 arranged to be open when it is engaged by a trip finger 144 on the arm 52 for like initial stopping purposes.

For selectively controlling the photo-cells 43 and 50 an electrical circuit is provided including the aforesaid photo-cells 43 and 50, and two spring opening switches 145 and 146, the former being closable by a cam 147 and the latter being closable by a cam 148. These cams are fast to the counter-shaft 128 and are so formed and timed that the circuit of one photo-electric cell is closed when the other is open. The closing period may be for a quarter of a revolution of the shaft 128 as indicated by the cam segments shown. The circuit controlled by these photo-cells 43 and 50 includes the audio amplifier 122, the output of which is modulated in accordance with variations in the current of the photo-cells under sound track variations. The counter-shaft 128, which in this instance carries all of the aforesaid cams is driven by a gear 150 from gear 151 which is fast to the drum shaft 31, the gear ratio being such that the cam shaft makes one revolution for two revolutions of the drum shaft.

In connection with the circuit from the audio amplifier 122 and loud speaker 25 it should be noted that a switch 152 is included, the movable contactor of which is mounted upon the insulating bar 133 and will open the circuit in one position of the said bar. This is to prevent confusion and improper action of the loud speaker during line for line travel of the easel 10.

For the purpose of deenergizing the magnets 65 and 65ª so that each will cause its drum to stop with the sound track corresponding to the scanned letter alined with the light source, the circuit of the Thyratron tube 116 includes a spring opened switch 153 the movable contactor of which is brought to circuit closing position by a cam 154 mounted upon and rotatable with the drum shaft 31. This cam 154 is shaped to maintain the Thyratron control circuit closed for eight-tenths of a revolution of the drum shaft 31 since this will complete a scanning of the eighty letters and characters about the circumference of the drum 16 and which extend approximately eighty per cent thereabout while the remaining twenty per cent of the circumference is blank. As long as this control circuit to the Thyratron remains closed the Thyratron is inactive and while so inactive the power tube 117 supplies current to one or the other of the drum feeding magnets 65 or 65ª. This current continues until the letter being scanned comes into coincidence with the same letter on the drum 16, whereupon the decrease in light value acting through the photo-cell 17 trips the Thyratron 116 and causes a blocking of the plate current in the power output tube 117 and thereby deenergizes whichever magnet 65 or 65ª is in operation. Thus the lateral motion of the audio sound track drum is stopped in registering relation with the sound track corresponding to the scanned letter.

For intermittently energizing the magnetic clutch 93, namely after each letter scanning, it is included in a circuit having a contact 155 normally engaged by a contactor 156 carried by the insulated bar 133, said contactor 156 being in the circuit supplied by current from the power tube 121. Since the power tube 121 is controlled by the Thyratron 120 it will supply current to the magnetic clutch 93 only under these contact conditions. This is made possible by a spring opening switch 157 in the circuit controlling the Thyratron 120 and intermittently closed by a cam 158 on the drum shaft 31. The switch 157 is in series with a fixed contact 160 normally engaged by a contactor 161 on the bar 133 and in the circuit of the Thyratron 120. This supplemental contact 160, when open, prevents the energization of the clutch 93 when the clutch 88 is to operate. When the contactor 161 follows the movement of the bar 133 it is brought into engagement with a fixed contact 162 forming a terminal of the circuit of Thyratron 120 and when so engaged the Thyratron is inactive. The segment of the cam 158 which closes the switch 157 is so positioned that it comes into operation as the cam 154 opens its circuit, thus at the end of a letter scanning the cam 158, closes switch 157 with Thyratron 120 in circuit but inactive, the power tube 121 supplies energizing current to the clutch 93 causing easel to travel laterally the distance of one letter, when, the photo electric cell 118 being affected, it in turn causes the Thyratron to function, thereby blocking the power tube and causing its output to cease.

Since the magnetic clutch 93 is also used to return the easel to its starting position at the beginning of a line, provision is made for energizing it, at the time the friction clutch part 101 shifts to reverse position, by including in the circuit of the magnet clutch 93 two spaced fixed contacts 163 and 164 both in the path of the contactor 132 and arranged to be bridged thereby when the bar 133 is shifted to its left side position. When these contacts are bridged the magnetic clutch 93 is supplied with current from the power pack 123 and remains energized until the easel 10 reaches its starting position. Then the operating rod 103 is automatically shifted to restore the friction clutch to direct drive and also throw the insulated bar 133 to the right and thus break the circuit through the contacts 163 and 164 to deenergize the magnetic clutch 93.

For energizing the magnetic clutch 88 it is included in a circuit from the power tube 121 but which circuit is normally open between the contactor 165 and a fixed contact 156 in the path of said contactor 165 but in the circuit leading to the magnetic clutch 88. The insulated bar 133 forms an extension of the clutch fork lever 102 and is therefore under the control of the operating rod 103. When the bar 133 moves to the left (as seen in Fig. 12), the contactor 165 engages the contact 156 to pass current to the clutch 88 from the power tube 121. This continues until vertical movement of the easel has, by alinement of the next line of type, caused the Thyratron to function thereby blocking the power tube and bringing the easel to rest in its correct position.

The operation is as follows:

Mounted on the easel 10 the copy 11 is illuminated by the light source 13. A line of copy is in proper vertical alignment and the first letter to be read has been brought to correct scanning position in alignment with optical system 14 and 15. Motors 30 and 94 are running and electrical power supplied to the amplifiers and all light sources are illuminated. The rotating scanning drum has just moved from its zero or initial position and the various electrical contacts and units are as shown in Fig. 12. It will be noted that the switch positions and cam locations shown in Fig. 12 are illustrative of every odd revolution of the scanning drum, i. e. 1st, 3rd, 5th, etc.

*1st revolution*

The drum 16 is in rotation for eight-tenths of a revolution, scanning and coincidence may occur on any character at any instant of this time. With magnet 65 energized by current from power tube 117 audio drum 35 moves laterally.

Coincidence occurs on letter F so photo-cell 17 trips Thyratron 115 which by grid control electrically blocks plate current of power tube 117 so that magnet 65 is instantly released and leaves audio track F in speaking position. At end of eight-tenths of a revolution contacts 153 are opened by the rotating cam 154 and the Thyratron 116 is opened and restored to an active condition. This type of tube when once excited continues to pass current after the exciting current has ceased and until its flow is otherwise interrupted.

At this time contacts 157 are closed for two-tenths of a revolution by cam 158 and current flows from the power tube 121 via contact 155 and contactor 156 to horizontal feed magnetic clutch 93. This current continues to flow until the next letter "O" comes into alignment, which is registered by photo-cell 107 and trips Thyratron 118 shutting off power supplied by the power tube 121, thereby instantly stopping the easel.

*2nd revolution*

At start of second revolution contact 145 is closed for one-half of a revolution of audio drum 35 (corresponding to one-fourth of a revolution of cam shaft 128) and the photo-cell 43 has its output modulated by the sound track 40 as previously selected and delivers this modulation current to audio amplifier 122 producing the spoken sound of letter F at the loud speaker 25.

Also at the start of the second revolution photo-cell 17 contacts are again closed for eight-tenths of a revolution by contact 153. Audio drum 36 moves laterally in synchronous motion, as the magnetic clutch 65a has been supplied with power from the power tube 117 through contacts 126. When coincidence occurs on letter "O" photo-cell 17 through the Thyratron 115 blocks off power supply to 65a and leaves the audio sound track 40 of "O" in speaking position.

At end of one and a half revolution magnetic clutch 72 is energized by power supplied from the common source (amplifier unit power pack 123) through the closing of contact 134 and audio drum 35 is returned to its normal zero position through engagement of 51 with return drive shaft 58. This return lateral motion continues until it interrupts its own power circuit when the contract 141 is pushed open at this position and horizontal motion ceases.

At the third revolution the electrical conditions are shown in Fig. 12 photo-cell 50 is connected through the closed contacts 146 to the audio amplifier 122 and the letter "O" is caused to be pronounced by loud speaker 25. At the interval two and one-half revolutions coil 72a is energized through closure of contacts 136 and lateral motion of arm 52 and audio drum 36 ensues until reaching its normal at rest position, the switches 142 and 143 are opened and motion ceases.

Having completed the reading of a line of type the easel travels a very short distance until the stop 105 on rod 103 is engaged and caused to move to the left. This moves clutch cone 101 from engagement with clutch part 97 to the reverse part 100 and likewise moves the switch rod 133 from engagement with right side contacts into engagement with the left contacts with the following results.

By engagement of clutch cone 101 with clutch part 100 the easel is caused to travel to the right to the beginning of the next line of type until stop 106 is engaged causing disengagement of part 101 and 100. Arm 114 has moved diaphragm quadrant 112 ninety degrees into position for vertical or line alignment. The vertical feed clutch 88 is now energized by current from the power tube 121 through contacts 156 and 165. Current from the photo-cell 107 is now fed through contacts 161 and 162 to the amplifier 121 and when alignment of the bottom of the horizontal line of type occurs, with a consequent sudden decrease of photo-cell current the Thyratron 120 cuts off power supply by power tube of 121 to magnetic clutch 88 and vertical travel ceases. This vertical travel will occur only in a small fraction of the time required for the return horizontal movement of the easel.

During the return travel of the easel switch arm 133 has opened contact 152 disconnecting the loud speaker, and contacts 131 are also open so that no lateral movement of audio drums 35 and 36 has occurred during this time.

Having thus described my invention, I claim:

1. A reading apparatus comprising an optical system for projecting the image of a letter, an opaque member having a plurality of transparent letter stencils thereon and also a plurality of transparent sound tracks corresponding respectively to said letters, means to move said member to cause said stencil letters to successively intercept the rays of said projected image, a sound amplifying system including a sound reproducer, a source of light, an optical system arranged to direct light rays from said source to intercept the path of travel of said sound tracks, circuit means including a photo-electric cell for actuating said amplifying system, said cell being located on the opposite side of said member from said light source but in the path of light rays therefrom, a control circuit for actuating said circuit means, and a photo-cell in said control circuit responsive to coincidence between the image of a letter and the same stencil letter to cause said amplifying system to operate said reproducer to audibly reproduce the letter in coincidence.

2. A reading apparatus comprising a device for successively scanning a row of letters, a sound amplifying system including a sound reproducer, means for comparing the projected image of a letter as scanned by said device with a stencil of that letter, and means responsive to the coincidence of said image and stencil letter for causing said amplifying system to operate said reproducer to audibly reproduce the letter in coincidence.

3. A reading apparatus comprising a device for successively scanning a row of letters, a sound amplifying system including a sound reproducer, a plurality of sound tracks for reproducing the sound of the respective letters, means for comparing the projected image of a letter as scanned by said device with a stencil of that letter, and means responsive to the coincidence of said image and stencil letter for causing the sound track of the compared letter to actuate said amplifying system and audibly reproduce the letter through said reproducer.

4. A reading apparatus comprising a device for successively scanning a row of letters, a sound amplifying system including a sound reproducer, a plurality of sound tracks for reproducing the sound of the respective letters, means for comparing the projected image of a letter as scanned by said device with a stencil of that letter, and means including a photo-electric cell responsive to the coincidence of said image and stencil letter for causing the sound track of the compared letter to actuate said amplifying system and audibly reproduce the letter through said loud speaker.

5. A reading apparatus comprising a device for successively scanning a row of letters, a sound amplifying system including a loud speaker, a plurality of sound tracks for reproducing the sound of the respective letters, means for comparing the projected image of a letter as scanned by said device with a stencil of that letter, and means including an optical system responsive to the coincidence of said image and stencil letter for causing the sound track of the compared letter to actuate said amplifying system and audibly reproduce the letter through said loud speaker.

6. A reading apparatus comprising a device for successively scanning a row of letters, a sound amplifying system including a sound reproducer, a member having stencil letters corresponding respectively to the letters in said row, means controlled by said scanning device to move said member to bring a stencil letter into coincidence with a scanned letter, and means responsive to said coincidence to actuate said amplifying system and enunciate said letter through said reproducer.

7. A reading apparatus comprising a member provided with a stencil letter, means to project the image of the same letter into coincidence with said stencil letter, a sound emplifying system including a sound reproducer, and means responsive to the coincidence of said image and stencil letter to actuate said amplifying system and enunciate said letter through said reproducer.

8. A reading apparatus comprising a member provided with a stencil letter, means to project the image of the same letter into coincidence with said stencil letter, a sound reproducer, and means responsive to coincidence of said image and stencil letter to actuate said reproducer to enunciate said letter.

9. A reading apparatus comprising an optical system for scanning a succession of letters and projecting images of said letters one at a time to a given point, a member provided with a plurality of like stencil letters, means to bring said letters successively into register with said point, a sound reproducer, two series of sound tracks, each series corresponding to the respective sounds of said letters, means reponsive to the coincidence of a letter image with a like stencil letter to actuate said reproducer to enunciate said letter, and means controlling said responsive means to cause the selected letter of one sound track series to be enunciated while said optical system is scanning a second letter.

10. A reading apparatus comprising an optical system for scanning letters and projecting images of said letters one at a time to a given point, a member provided with a row of like letters in stencil and a plurality of stencil sound tracks corresponding respectively to the sounds of said letters, a sound reproducer, electrical means including a light sensitive device operated by said sound tracks for actuating said reproducer, means to move said member to cause said letter row to intercept said projected images to establish coincidence between one letter image and the like letter stencil, and means responsive to such coincidence for causing the sound track corresponding to said letter to operate said light sensitive device, whereby said reproducer enunciates said letter.

11. A reading apparatus comprising an optical system for scanning letters and projecting images of said letters one at a time to a given point, a row of like letters in stencil, a plurality of stencil sound tracks corresponding respectively to the sounds of said letters, a sound reproducer, electrical means including a light sensitive device operated by said sound tracks for actuating said reproducer, means to cause said letter row to pass said given point to establish coincidence between one letter image and the like letter stencil, and means responsive to such coincidence for causing the sound track corresponding to said letter to operate said light sensitive device, whereby said reproducer enunciates said letter.

12. A reading apparatus comprising an optical system for projecting the image of a letter to a given point, a member provided with a plurality of stencil letters, means to bring said letters successively into register with said point, a sound reproducer, two series of sound tracks, each series corresponding to the respective sounds of said letters, means to alternately associate said series with said stencil member, and means responsive to the coincidence of a letter image with a like stencil letter when so associated to actuate said reproducer to enunciate said letter.

13. A reading apparatus comprising an optical system for projecting the image of a letter to a given point, a member provided with a plurality of stencil letters, means to bring said letters successively into register with said point, a sound reproducer, two series of sound tracks, each series corresponding to the respective sounds of said letters, means controlled by the coincidence of a letter image and the same letter stencil for selectively actuating said sound track series, and means responsive to such coincidence for causing the selected sound track to operate said reproducer to enunciate the said letter.

14. A reading apparatus comprising an optical system for projecting the image of a letter to a given point, a member provided with a plurality of stencil letters, means to bring said letters successively into register with said point, a sound reproducer, two series of sound tracks, each series corresponding to the respective sounds of said letters, means including two photo-electric circuits controlled by the coincidence of a letter image and the same letter stencil for selectively actuating said sound track series, and means responsive to such coincidence for causing the selected sound track to operate said reproducer to enunciate the said letter.

15. A reading apparatus comprising an optical system for projecting the image of a letter to a given point, a member provided with a plurality of stencil letters, means to bring said letters successively into register with said point, a sound reproducer, two series of sound tracks, each series corresponding to the respective sounds of said letters, means controlled by the coincidence of a letter image and the same letter stencil for selectively actuating said sound track series, and means including a photo-electric circuit responsive to such coincidence for causing the selected sound track to operate said reproducer to enunciate the said letter.

16. A reading apparatus comprising an optical system for projecting the image of a letter to a given point, a rotatable drum provided with a plurality of stencil letters, a shaft for mounting said drum, means to drive said shaft, a sound reproducer, two drums mounted to rotate with said shaft and axially movable thereon, a series of stencil sound tracks on each drum corresponding to said letter stencils and arranged in the same order, means including a light source, an optical system and a photo-electric cell associated with each drum for respectively operating said reproducer, means responsive to the coincidence of a letter image with the like letter stencil for selecting one drum for axial movement into operative relation with said light source means, and means to stop said axial movement when the sound track of the letter in coincidence registers with said light source, whereby said reproducer operates to enunciate said letter.

17. A reading apparatus comprising an easel for mounting reading matter, an optical system for scanning letters successively in a line of said reading matter, and means including a photo-electric cell responsive to said optical system for causing said easel to move laterally step by step to bring each letter into register with said optical system.

18. A reading apparatus comprising an easel for mounting reading matter, an optical system for scanning the lines of said reading matter successively, and means including a photo-electric cell responsive to said optical system for causing said easel to move vertically step by step to bring each line into register with said optical system.

19. A reading apparatus comprising an easel for mounting reading matter, an optical system for scanning letters and lines of said reading matter, means for moving said easel laterally for letter to letter scanning, means for moving said easel vertically for line to line scanning, and means including a photo-electric cell responsive to said optical system for selectively controlling said easel moving means.

ALFRED R. SHARPLES.